United States Patent
Kurian (10) Patent No.: US 12,475,453 B1
(45) Date of Patent: Nov. 18, 2025

(54) MICRO-DATA TRANSFER USING A DUAL TRANSMISSION NETWORK

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 49 days.

(21) Appl. No.: 18/757,806

(22) Filed: Jun. 28, 2024

(51) Int. Cl.
  *G06Q 20/38* (2012.01)
  *G06Q 20/20* (2012.01)
  *G06Q 20/40* (2012.01)

(52) U.S. Cl.
  CPC .......... *G06Q 20/382* (2013.01); *G06Q 20/20* (2013.01); *G06Q 20/40* (2013.01)

(58) Field of Classification Search
  None
  See application file for complete search history.

(56) References Cited

U.S. PATENT DOCUMENTS

| | | | | |
|---|---|---|---|---|
| 8,706,557 | B1 * | 4/2014 | Tavares | G06Q 20/204 |
| | | | | 705/16 |
| 9,129,464 | B2 * | 9/2015 | Hansen | G06Q 20/3672 |
| 9,779,452 | B1 * | 10/2017 | Medina | G06V 10/20 |
| 11,475,456 | B2 * | 10/2022 | Ponniah | G06N 3/09 |
| 11,526,858 | B2 * | 12/2022 | Burkinshaw | G06Q 20/4012 |
| 11,704,666 | B1 * | 7/2023 | Barakat | G06Q 20/4015 |
| | | | | 705/44 |
| 11,842,351 | B2 * | 12/2023 | Benkreira | G06Q 20/4016 |
| 11,989,165 | B2 * | 5/2024 | Dubey | G06F 16/258 |

(Continued)

FOREIGN PATENT DOCUMENTS

| | | | | |
|---|---|---|---|---|
| CA | 2841267 | C * | 6/2017 | G06Q 20/3224 |
| CA | 2950742 | C * | 1/2018 | G06Q 20/3272 |

(Continued)

OTHER PUBLICATIONS

Md, et al. "Machine Learning Software Engineering in Practice: An Industrial Case Study," Montreal, Canada, https://arxiv.org/pdf/1906.07154 (Year: 2019).*

(Continued)

*Primary Examiner* — El Mehdi Oussir
(74) *Attorney, Agent, or Firm* — Weiss & Arons LLP (57) ABSTRACT

Systems and methods for a system architecture for supporting bifurcated data transmission are provided. The system architecture may include a point-of-sale ("POS") device. The system architecture may include a central server. The POS device may break up a transaction request received from a requestor into micro-data. Each micro-data may include a tiny portion of the transaction request and a header. The header may identify the transaction request and a number that identifies a location of the micro-data within the transaction request. The POS device may send the micro-data to a quantum processor for arranging the micro-data in a queue in a random order. The POS device may also compile a confirmatory data packet including data identifying the point-of-sale device and a total number of the micro-data. The confirmatory data packet and the micro-data, in the random order, may be transmitted to the central server.

18 Claims, 5 Drawing Sheets

(56) References Cited

U.S. PATENT DOCUMENTS

| | | | | |
|---|---|---|---|---|
| 2006/0253390 | A1* | 11/2006 | McCarthy | G06Q 20/20 |
| | | | | 705/39 |
| 2008/0011844 | A1* | 1/2008 | Tami | G06Q 20/204 |
| | | | | 235/385 |
| 2009/0132381 | A1* | 5/2009 | Gangi | G06Q 30/0253 |
| | | | | 705/18 |
| 2009/0271278 | A1* | 10/2009 | Bishop | G06Q 20/02 |
| | | | | 235/380 |
| 2012/0095819 | A1* | 4/2012 | Li | G06Q 30/02 |
| | | | | 705/14.23 |
| 2014/0310167 | A1* | 10/2014 | Meyer | G06Q 20/04 |
| | | | | 705/40 |
| 2014/0372198 | A1* | 12/2014 | Goldfinger | G07G 1/14 |
| | | | | 705/14.33 |
| 2015/0356556 | A1* | 12/2015 | Celikyilmaz | G06Q 20/3224 |
| | | | | 705/14.51 |
| 2018/0336547 | A1* | 11/2018 | Finke | G06Q 20/4012 |
| 2019/0139048 | A1* | 5/2019 | Senci | G06Q 20/12 |
| 2019/0149372 | A1* | 5/2019 | Huang | H04B 5/24 |
| | | | | 375/295 |
| 2020/0204527 | A1* | 6/2020 | Vass | H04L 63/0428 |
| 2021/0256010 | A1* | 8/2021 | Sinclair | G06F 16/2379 |
| 2021/0256144 | A1* | 8/2021 | Shrinivasan | G06F 21/6245 |
| 2021/0256145 | A1* | 8/2021 | Shrinivasan | H04L 9/3236 |
| 2022/0019901 | A1* | 1/2022 | Saleh | H04L 9/50 |
| 2022/0101331 | A1* | 3/2022 | Collicoat | G06Q 20/405 |
| 2022/0138181 | A1* | 5/2022 | Irazabal | G06F 16/2379 |
| | | | | 707/703 |
| 2022/0263886 | A1* | 8/2022 | Rose | G06Q 20/409 |
| 2023/0274272 | A1* | 8/2023 | Wied | G06Q 20/401 |
| | | | | 705/39 |
| 2023/0334163 | A1* | 10/2023 | Stephens | G06F 21/6209 |
| 2023/0342778 | A1* | 10/2023 | Wied | G06Q 20/386 |
| 2024/0220999 | A1* | 7/2024 | Gao | G06V 10/25 |

FOREIGN PATENT DOCUMENTS

| | | | | |
|---|---|---|---|---|
| CA | 3073197 | A1 * | 2/2019 | G06Q 20/4014 |
| CA | 2813236 | C * | 7/2019 | G06Q 20/10 |
| CN | 101506820 | A * | 8/2009 | G06Q 20/24 |
| CN | 101295393 | B * | 5/2012 | G06Q 30/02 |
| CN | 103635920 | A * | 3/2014 | G06Q 20/326 |
| CN | 103765454 | A * | 4/2014 | G06Q 20/02 |
| CN | 104272335 | A * | 1/2015 | G06Q 20/387 |
| CN | 106465112 | A * | 2/2017 | H04L 9/3234 |
| CN | 107408253 | A * | 11/2017 | G06Q 20/12 |
| CN | 111587445 | A * | 8/2020 | G06Q 30/018 |
| CN | 113193966 | A * | 7/2021 | H04L 9/3239 |
| CN | 113302638 | A * | 8/2021 | G06Q 40/03 |
| CN | 113474803 | A * | 10/2021 | G06V 40/1365 |
| CN | 114385409 | A * | 4/2022 | G06F 11/1076 |
| CN | 109844753 | B * | 5/2022 | G06Q 20/204 |
| CN | 115034773 | A * | 9/2022 | G06Q 30/0635 |
| CN | 115905411 | A * | 4/2023 | |
| CN | 116113967 | A * | 5/2023 | G06Q 50/184 |
| CN | 116745790 | A * | 9/2023 | G06Q 20/3274 |
| CN | 117522417 | A * | 2/2024 | G06Q 20/401 |
| CN | 114693450 | B * | 9/2025 | G06F 16/2462 |
| EP | 2065798 | A1 * | 6/2009 | G06Q 20/325 |
| FR | 2908578 | A1 * | 5/2008 | H04L 67/54 |
| JP | 2019501475 | A * | 1/2019 | G06Q 30/0625 |
| JP | 2023010533 | A * | 1/2023 | |
| JP | 2023504492 | A * | 2/2023 | G06F 9/54 |
| KR | 20250068873 | A * | 5/2025 | G06N 20/00 |
| WO | WO-2009121046 | A1 * | 10/2009 | H04W 4/14 |
| WO | WO-2011047041 | A1 * | 4/2011 | G06Q 30/02 |
| WO | WO-2016183048 | A1 * | 11/2016 | G06Q 20/3255 |
| WO | WO-2018144591 | A1 * | 8/2018 | G06Q 20/34 |
| WO | WO-2018209138 | A1 * | 11/2018 | G06Q 10/107 |
| WO | WO-2022101933 | A1 * | 5/2022 | G06Q 40/02 |
| WO | WO-2022271686 | A2 * | 12/2022 | G06Q 30/0202 |
| WO | WO-2023200007 | A1 * | 10/2023 | G06Q 40/06 |
| WO | WO-2025040889 | A1 * | 2/2025 | G06V 40/172 |

OTHER PUBLICATIONS

Farid, Khan, "I-POST: Intelligent Point of Sale and Transaction System," Department of Computer Science, Kennesaw State University, Mariatta, Georgia, USA, https://arxiv.org/pdf/2011.06144 (Year: 2020).*

* cited by examiner

MICRO-DATA TRANSFER USING A DUAL TRANSMISSION NETWORK

FIELD OF TECHNOLOGY

Aspects of the disclosure relate to transmitting data using systems and methods having heightened security protocols.

BACKGROUND OF THE DISCLOSURE

Data is continuously transmitted across the globe for the plurality of needs and functions of our advanced society. Because of the sensitivity of the most important types of data transmissions, it is imperative that the data be transmitted in a fully secure way. Interception of data transmission can lead to financial loss, stolen identities, and a compromised image of the companies supporting the data transmissions.

It would be desirable, therefore, to provide systems and methods for bifurcating data transmissions to increase the likelihood that the data being transmitted cannot be intercepted.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A system architecture for supporting bifurcated data transmission is provided. The system architecture may include a point-of-sale ("POS") device. The system architecture may include a central server. The central server may host a first IP address. The central server may host a second IP address.

The POS may receive a transaction request. The transaction request may be received from a requestor. The POS may break up the transaction request into micro-data. The micro-data may include at least one hundred pieces of data, one thousand pieces of data, two thousand pieces of data, five thousand pieces of data or any other suitable number. The micro-data may be generated to have a number of pieces of data that is greater than a threshold value. Each piece of micro-data may store a portion of a string of code. Each piece of micro-data may store a string of code.

Each micro-data may include a tiny portion of the transaction request. The micro-data may be no more than a tenth, a hundredth, a thousandth, or any other suitable fraction of the transaction request.

Each micro-data may also include a header. The header may identify the transaction request. The header may also include a number. The number may identify a location of the micro-data within the transaction request. Compiling the micro-data in numerical order may therefore recreates the transaction request. For example, there may be 1,000 pieces of micro-data. As the transaction request is broken up, each piece of micro-data may be assigned a number from 1-1,0000. Arranging the micro-data in the assigned numerical order may re-create the transaction request.

In some embodiments, the POS may transmit the micro-data to a quantum processor for arranging in a random order the micro-data in a queue. The quantum processor may use quantum entanglement to arrange the micro-data in a truly random order that cannot be predicted or recreated. The quantum processor may then transmit the micro-data, in the order, to the POS. The POS may store the micro-data a queue in the random order.

In some embodiments, the POS may transmit to a quantum processor the total number of micro-data. The quantum processor may generate a random order of numbers in the total number of micro-data. The random order may be transmitted to the POS, which may subsequently transmit the micro-data to the central server in the random order. For example, if the first two numbers in the random order are 73 and 1,003, the POS may initially transmit to the central server the micro-data with the header having the number 73 and secondly transmit to the central server the micro-data with the header having the number 1,003.

The POS may also compile a confirmatory data packet. The confirmatory data packet may include data identifying the point-of-sale device and a total number of the micro-data.

The POS may transmit the transaction request to a central server by triggering, in parallel, a first and second data transfer.

In some embodiments, the first data transfer may comprise transmitting the micro-data to a first IP address in the random order.

In some embodiments, the first data transfer may include transmitting the micro-data to the first IP address in an order different from the numerical order. The order different from the numerical order may be generated by a quantum computer. The order different from the numerical order may be generated by the POS.

The second data transfer may include transmitting the confirmatory data packet to a second IP address.

The central server may instruct the first processor to store the micro-data received by the first IP address in a temporary queue. The central server may also instruct the first processor to execute a routine to verify each micro-data before adding it to the temporary queue. The verifying may include determining if the micro-data includes corrupted or harmful data.

After receipt, by the first processor, of a threshold number of micro-data, the central server may instruct a second processor to extract the data stored in the confirmatory data packet and execute a confirmatory routine. The confirmatory routine may include confirming whether the point-of-sale device is authorized to execute a transaction via the central server.

The central server, in response to the second processor failing to confirm the authorization of the central server to execute the transaction, may execute a force reject of the transaction request. The force reject may include instructing the first IP address to delete all stored micro-data received from the POS and quarantine any future micro-data received from the POS. The force reject may include and instructing the second IP address to delete the confirmatory data set.

In response to a confirmation of the authorization of the central server to execute the transaction, the central server may instruct the first processor to generate a fillable template. The fillable template may include a plurality of slots. A number of the plurality of slots may be equal to the total number of micro-data. The total number of the micro-data may be retrieved by the central server from the confirmatory data packet. Each slot may be assigned a number corresponding a number stored in a header of a piece of micro-data.

The first processor may then initiate a re-creation of the transaction request. The re-creation of the transaction request may include storing each piece of micro-data in the temporary queue in a slot having an assigned number equal to the number of the piece of micro-data.

The first processor may execute a routine to verify each micro-data before adding it to the fillable template. The verifying may include determining if the micro-data includes corrupted or harmful data.

In some embodiments, after the generation of the fillable template, the central server may store each additional micro-data received in the fillable template. Each additional micro-data may be stored in a slot having an assigned number equal to the number of the additional micro-data. In response to all the slots being filled in the fillable template, the central server may process the transaction request.

In some embodiments, after the generation of the fillable template, the first processor may perform, in parallel, a first method step and second method step. The first method step may include storing each additional micro-data received in the fillable template. Each additional micro-data may be stored in a slot having an assigned number equal to the number of the additional micro-data.

The second method step may include running an artificial intelligence ("AI") algorithm to use training data to attempt to complete the fillable template by filling in slots not yet filled by micro-data. The training data may include a large number of transaction requests that were completed by the central server.

In response to the AI algorithm generating an AI-completed fillable template with a predicted accuracy level greater than a threshold accuracy level, the first processor may process the AI-completed fillable template as the transaction prior to having received all of the micro-data.

In some embodiments, the central server may receive all of the micro-data prior to the AI algorithm generating an AI-completed fillable template. In some of these embodiments, the received micro-data may be used to fully populate the fillable template. The central server may then execute the transaction based on the data stored in the fully populated fillable template.

During receipt of the micro-data from the POS, the central server may run a machine learning algorithm to plot receipt times of each received micro-data. The central server may generate an expected behavior of subsequent receipt times of micro-data. In response to receipt times of micro-data deviating from the expected behavior by a deviation amount, the central server may execute a force reject of the transaction.

Methods performed by the first IP address may be performed by the second IP address. Methods performed by the second IP address may be performed by the first IP address. Methods described herein as being performed by the central server may be performed by the first IP address and/or the second IP address.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
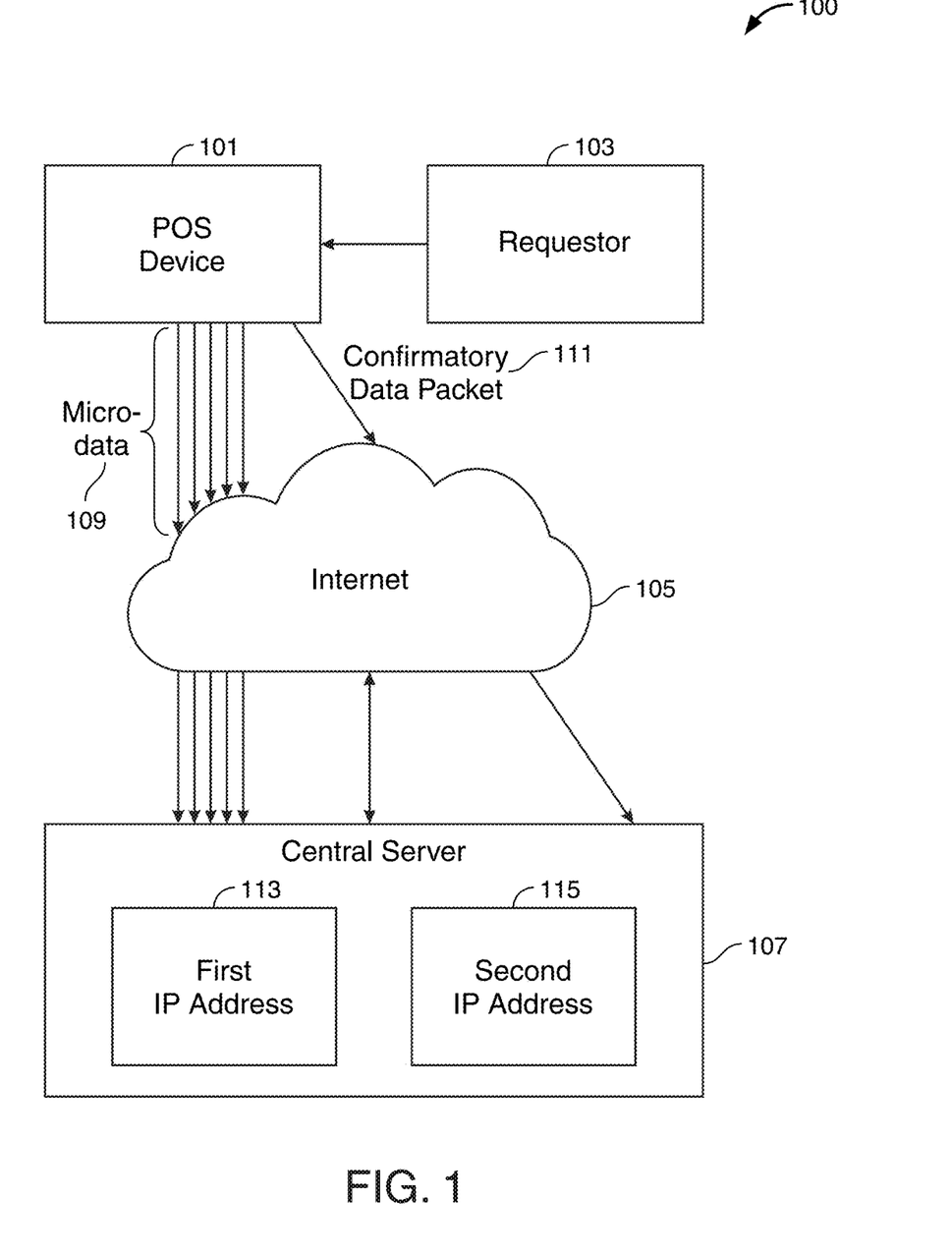
FIG. 1 shows an illustrative architecture diagram in accordance with principles of the disclosure.

FIG. 1 shows illustrative system architecture 100 in accordance with principles of the disclosure. FIG. 1 may include POS device 101. POS device 101 may be the POS device. POS device 101 may be in communication with requestor 103. POS device 101 may receive a transaction request from requestor 103. Requestor 103 may be a credit card, a smart card, a smart phone, a lap top, or any other suitable computing device or data storage device.

POS device 101 may be in electronic communication with central server 107 via internet connection 105. Central server 107 may be the central server. POS device may use internet connection 105 to transmit to central server micro-data 109 and confirmatory data packet 111.

Central server 107 may host first IP address 113 and second IP address 115.

Figure 2:
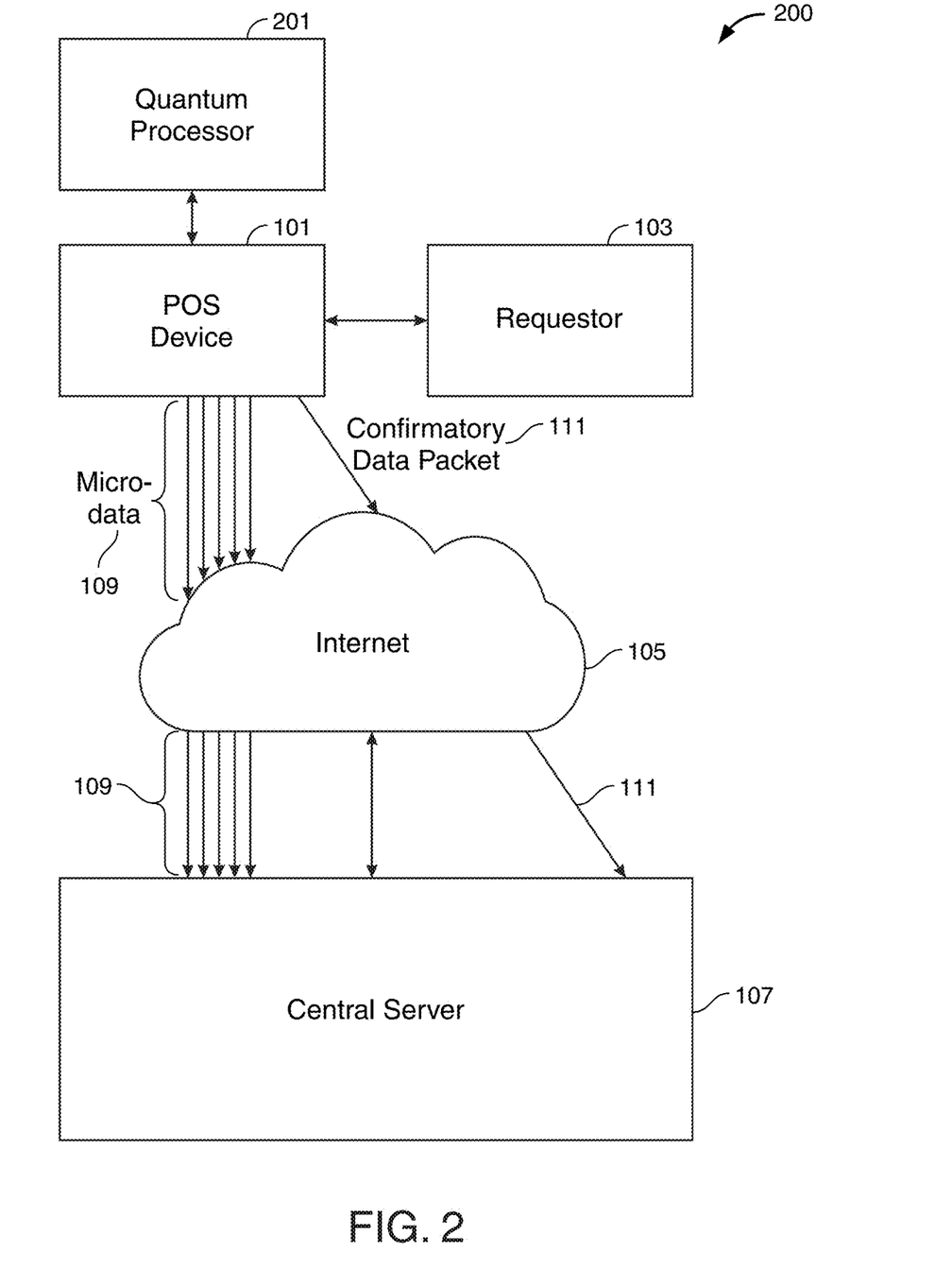
FIG. 2 shows an illustrative architecture diagram in accordance with principles of the disclosure.

FIG. 2 shows illustrative system architecture 200. System architecture may have one or more features in common with system architecture 100. System architecture 200 may include quantum processor 201. Quantum processor 201 may be used to generate a random order for transmitting micro-data 109 to central server 107. Because of the inherent nature of quantum processing, the random order generated by quantum processor 201 cannot be predicted by any system. This may provide enhanced transmission security as the order in which the data is to be transmitted cannot be guessed by any outside actor.

Figure 3:
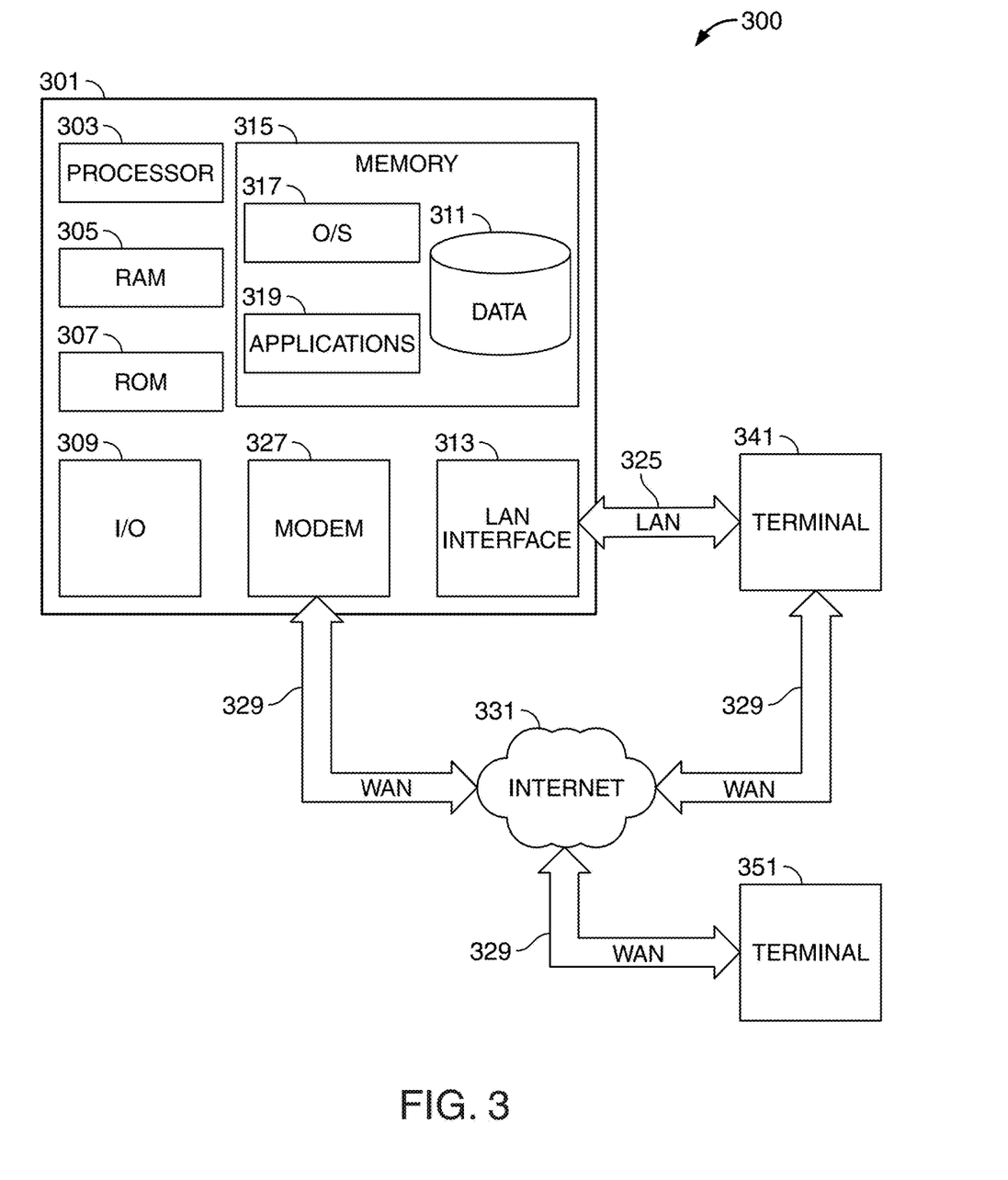
FIG. 3 shows an illustrative block diagram in accordance with principles of the disclosure.

FIG. 3 shows an illustrative block diagram of system 300 that includes computer 301. Computer 301 may alternatively be referred to herein as an "engine," "server" or a "computing device." The computing system may include one or more computer servers. Computer 301 may be any computing device described herein, such POS device 101, requestor 103 and central server 107. Elements of system 300, including computer 301, may be used to implement various aspects of the systems and methods disclosed herein.

Computer 301 may have a processor 303 for controlling the operation of the device and its associated components, and may include RAM 305, ROM 307, input/output circuit 309, and a non-transitory or non-volatile memory 315. Machine-readable memory may be configured to store information in machine-readable data structures. Other components commonly used for computers, such as EEPROM or Flash memory or any other suitable components, may also be part of the computer 301.

Memory 315 may be comprised of any suitable permanent storage technology—e.g., a hard drive. Memory 315 may store software including the operating system 317 and application(s) 319 along with any data 311 needed for the operation of computer 301. Memory 315 may also store videos, text, and/or audio assistance files. The data stored in Memory 315 may also be stored in cache memory, or any other suitable memory.

Input/output ("I/O") module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality.

Computer 301 may be connected to other systems via a local area network (LAN) interface 313. Computer 301 may operate in a networked environment supporting connections to one or more remote computers, such as terminals 341 and 351. Terminals 341 and 351 may be personal computers or servers that include many or all of the elements described above relative to computer 301.

When used in a LAN networking environment, computer 301 is connected to LAN 325 through a LAN interface 313 or an adapter. When used in a WAN networking environment, computer 301 may include a modem 327 or other means for establishing communications over WAN 329, such as Internet 331.

In some embodiments, computer 301 may be connected to one or more other systems via a short-range communication network (not shown). In these embodiments, computer 301 may communicate with one or more other terminals 341 and 351, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server, such as the remote emulator, may transmit data to any other suitable computer system. The web-based server may also send computer-readable instructions, together with the data, to any suitable computer system or device, such as the central server. The computer-readable instructions may be to store the data in cache memory, the hard drive, secondary memory, or any other suitable memory.

Additionally, application program(s) 319, which may be used by computer 301, may include computer executable instructions for invoking functionality related to communication, such as e-mail, Short Message Service (SMS), and voice input and speech recognition applications. Application program(s) 319 (which may be alternatively referred to herein as "plugins," "applications," or "apps") may include computer executable instructions for invoking functionality related to performing various tasks. Application programs 319 may utilize one or more algorithms that process received executable instructions, perform power management routines or other suitable tasks. Application programs 319 may include any one or more of the applications, instructions and algorithms associated with functions performed by the POS device and the central server, as described herein.

Application program(s) 319 may include computer executable instructions (alternatively referred to as "programs"). The computer executable instructions may be embodied in hardware or firmware (not shown). Computer 301 may execute the instructions embodied by the application program(s) 319 to perform various functions.

Application program(s) 319 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 319 may include one or more algorithms that may be used to implement features of the disclosure.

The invention may be described in the context of computer-executable instructions, such as applications 319, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 351 and/or terminal 341 may be portable devices such as a laptop, cell phone, Blackberry™, tablet, smartphone, or any other computing system for receiving, storing, transmitting and/or displaying relevant information. Terminal 351 and/or terminal 341 may be one or more user devices. In illustrative embodiments, computer 301 may represent the POS, terminal 351 may represent the requestor and terminal 341 may represent the quantum processor. Computer 301 may represent the central server and terminal 351 may represent a first POS and terminal 341 may represent a second POS. Terminals 351 and 341 may be identical to computer 301 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 4:
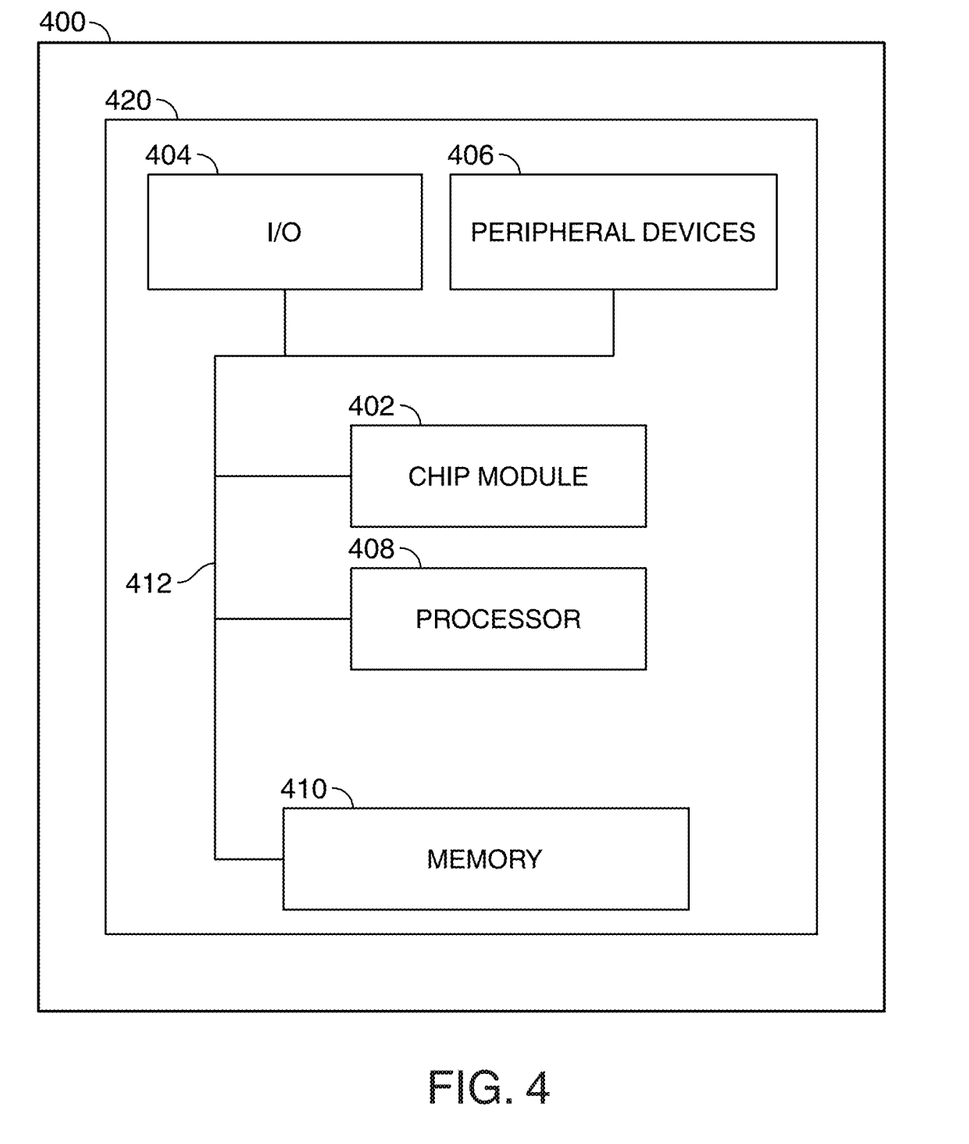
FIG. 4 shows an illustrative apparatus that may be configured in accordance with principles of the disclosure.

FIG. 4 shows illustrative apparatus 400 that may be configured in accordance with the principles of the disclosure. Apparatus 400 may be a computing device such as computer 301. Computer 301 may include some or all of the components of apparatus 400.

Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions, (which may be alternatively referred to herein as "computer instructions" or "computer code"), applications such as applications 119, signals, and/or any other suitable information or data structures.

Components 402, 404, 406, 408 and 410 may be coupled together by a system bus or other interconnections 412 and may be present on one or more circuit boards such as circuit board 420. In some embodiments, the components may be integrated into a single chip. The chip may be silicon-based.

Figure 5:
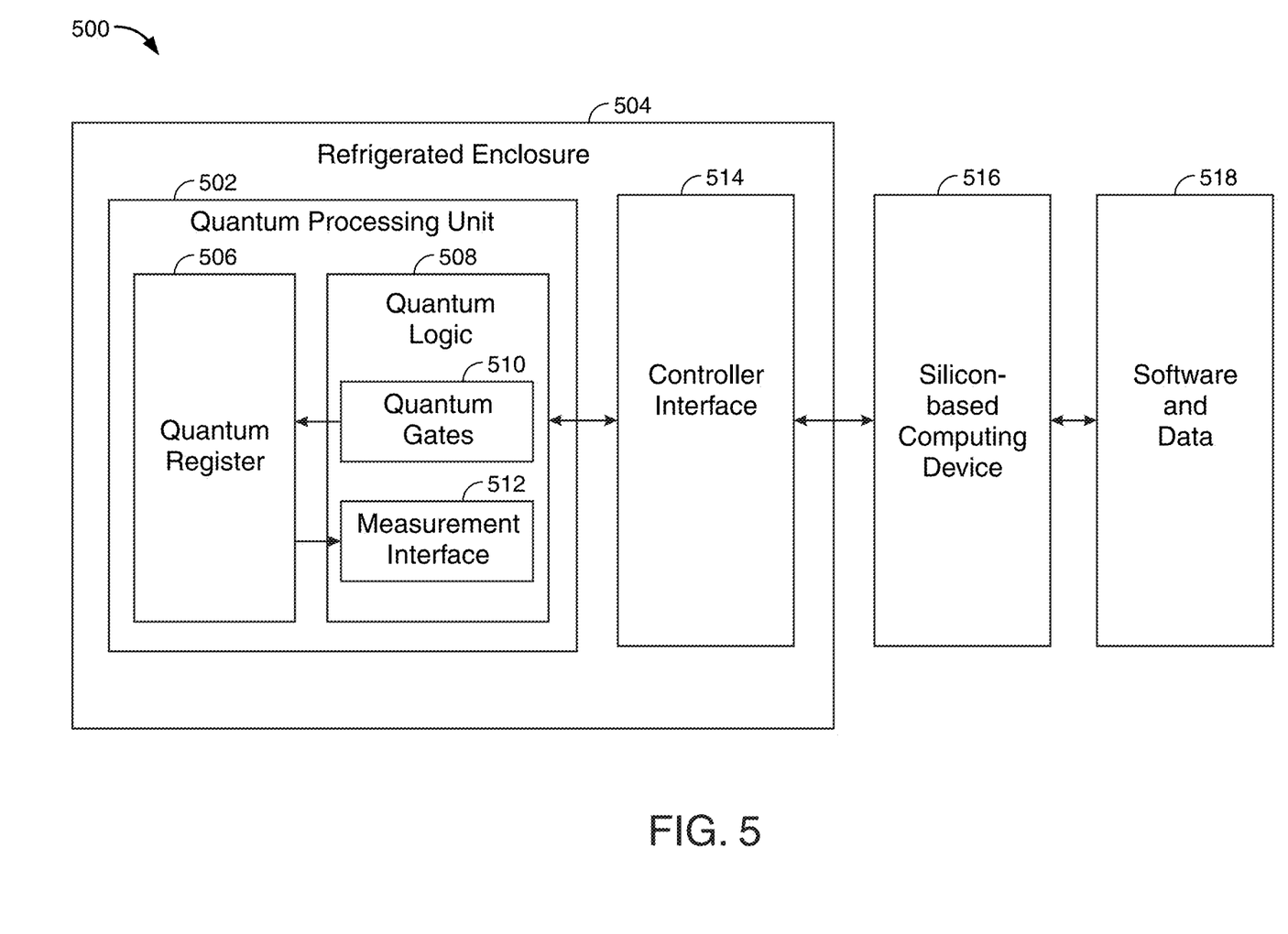
FIG. 5 shows additional illustrative apparatus that may be configured in accordance with principles of the disclosure.

FIG. 5 shows illustrative block diagram of system 500. System 500 may be the quantum processor. System 500 may include quantum processing unit 502. Quantum processing unit 502 may be a processing unit that relies on quantum principles to perform tasks. Quantum processing unit 502 may include quantum register 506. Quantum processing unit 502 may include quantum logic 508. Quantum logic 508 may include quantum gates 510 and measurement interface 512.

Quantum register 506 may be comprised of qubits. Each qubit may have a distinct state of either zero or one, like a classical bit. However, unlike a classical bit, a qubit may have a superposition state. The superposition state may be a state in which the qubit exists as all possible states simultaneously. In order to retain the qubits in a superposed state, the qubits must be maintained at a degree close to absolute zero (kelvin). Refrigerated enclosure 504 may maintain the qubits at a degree close to absolute zero (kelvin).

Quantum gates 510 may include quantum algorithms, such as algorithms based on amplitude amplification, algorithms based on the quantum Fourier transform, algorithms based on quantum walks and/or any other suitable quantum algorithms. Each algorithm may include a series of one or more quantum gates, such as but not limited to identity gates, Pauli gates, controlled gates, phase shift gates, Hadamard gates, swap gates and Toffoli gates. Measurement interface 512 may measure a state of each qubit after being processed by the algorithms included in quantum gates 510. The measured state of each qubit may be a finite state.

The measured state may be transmitted to controller interface 514. Controller interface 514 may enable information to be transmitted between quantum processing unit 502 and silicon-based computing device 516. The measured state may be transmitted to silicon-based computing device 516. Silicon-based computing device 516 may include software and data 518. Software and data 518 may be used to process the measured state that was transmitted from quantum processing unit 502. Silicon-based computing device 516 may transmit data included in software and data 518 to controller interface 514. Controller interface 514 may transmit the data to quantum processing unit 502 to be processed and analyzed. Controller interface 514 may be used to transmit data to POS device 101.

Thus, systems and methods for providing data transmission systems with enhanced security features are provided. Persons skilled in the art will appreciate that the present invention can be practiced by other than the described embodiments, which are presented for purposes of illustration rather than of limitation.

What is claimed is:

1. A system architecture for supporting bifurcated data transmission the system architecture comprising:
   a point-of-sale ("POS") device, the POS further comprises a memory storing instructions, when executed by a processor, causes the processor to perform operations comprising:
   receiving a transaction request from a requestor;
   breaking up the transaction request into micro-data, each micro-data including a tiny portion of the transaction request and a header that:
   identifies the transaction request and a number that identifies a location of the micro-data within the transaction request, wherein compiling the micro-data in numerical order recreates the transaction request; and
   sends the micro-data to a quantum processor for arranging the micro-data in a queue in a random order;
   compiling a confirmatory data packet including data identifying the point-of-sale device and a total number of the micro-data; and
   transmitting the transaction request to a central server by triggering, in parallel, a first and second data transfer wherein:
   the first data transfer comprises transmitting the micro-data to a first IP address in the random order; and
   the second data transfer comprises transmitting the confirmatory data packet to a second IP address;
   the central server further comprising a central server memory storing central server instructions that, when executed by one or more central server processors, cause a first central server processor to perform operations comprising:
   hosting the first IP address and the second IP address, the central server being configured to:
   store the micro-data received by the first IP address in a temporary queue;

after receipt of a threshold number of micro-data, instructing a second central server processor to extract the data stored in the confirmatory data packet and execute a confirmatory routine, the confirmatory routine including confirming whether the point-of-sale device is authorized to execute a transaction via the central server; and in response to a confirmation of the authorization of the central server to execute the transaction, instructing the first central server processor to:

generate a fillable template with a plurality of slots equal to the total number of micro-data stored in the confirmatory data packet, each slot being assigned a number corresponding a number stored in a header of a piece of micro-data;

initiate the re-creation of the transaction request by storing each piece of micro-data in the temporary queue in a slot having an assigned number equal to the number of the piece of micro-data;

after the generation of the fillable template performing, in parallel, the method steps of:

storing each additional micro-data received in the fillable template, each additional micro-data being stored in a slot having an assigned number equal to the number of the additional micro-data; and execute an artificial intelligence ("AI") algorithm to use training data to complete the fillable template by filling in slots not yet filled by micro-data; and in response to the AI algorithm generating an AI-completed fillable template with a predicted accuracy level greater than a threshold accuracy level, processing the AI-completed fillable template as the transaction prior to having received all of the micro-data.

2. The system architecture of claim 1 wherein the micro-data includes at least one thousand pieces of data.

3. The system architecture of claim 1 wherein the micro-data includes a number of pieces of data that is greater than a threshold value.

4. The system architecture of claim 1 wherein each piece of micro-data stores a portion of a string of code.

5. The system architecture of claim 1 wherein the central server, in response to the second central server processor failing to confirm the authorization of the central server to execute the transaction, executes a force reject of the transaction request.

6. The system architecture of claim 5 wherein the force reject includes:

instructing the first IP address to delete all stored micro-data received from the POS and quarantine any future micro-data received from the POS; and instructing the second IP address to delete the confirmatory data set.

7. The system architecture of claim 1 further comprising the first central server processor executing a routine to verify each micro-data before adding it to the temporary queue, wherein the verifying comprises determining if the micro-data includes corrupted or harmful data.

8. The system architecture of claim 1 further comprising the first central server processor executing a routine to verify each micro-data before adding it to the fillable template, wherein the verifying comprises determining if the micro-data includes corrupted or harmful data.

9. The system architecture of claim 1 further comprising the central server executing a machine learning algorithm to:

plot receipt times of each received micro-data;

generate an expected behavior of subsequent receipt times of micro-data; and if receipt times of micro-data deviates from the expected behavior by a deviation amount, executes a force reject of the transaction.

10. The system architecture of claim 1 further comprising:

receiving all of the micro-data prior to the AI algorithm generating an AI-completed fillable template, the received micro-data being used to fully populate the fillable template; and executing the transaction based on the data stored in the fully populated fillable template.

11. A method for supporting bifurcated data transmission, the method comprising:

receiving, a point-of-sale ("POS") device, a transaction request from a requestor;

breaking up the transaction request into micro-data, each micro-data including a tiny portion of the transaction request and a header that:

identifies the transaction request and a number that identifies a location of the micro-data within the transaction request, wherein compiling the micro-data in numerical order recreates the transaction request; and sends the micro-data to a quantum processor for arranging the micro-data in a queue in a random order;

compiling a confirmatory data packet including data identifying the point-of-sale device and a total number of the micro-data; and transmitting the transaction request to a central server by triggering, in parallel, a first and second data transfer wherein:

the first data transfer comprises transmitting the micro-data to a first IP address in the random order; and the second data transfer comprises transmitting the confirmatory data packet to a second IP address;

hosting, using the central server, the first IP address and the second IP address;

storing, using the central server, the micro-data received by the first IP address in a temporary queue;

after receipt of a threshold number of micro-data, instructing, using the central server to extract the data stored in the confirmatory data packet;

executing, using the central server, a confirmatory routine, the confirmatory routine including confirming whether the point-of-sale device is authorized to execute a transaction via the central server; and in response to a confirmation of the authorization of the central server to execute the transaction, using the central server processor to instruct:

generate a fillable template with a plurality of slots equal to the total number of micro-data stored in the confirmatory data packet, each slot being assigned a number corresponding a number stored in a header of a piece of micro-data;

initiate the re-creation of the transaction request by storing each piece of micro-data in the temporary queue in a slot having an assigned number equal to the number of the piece of micro-data;

after the generation of the fillable template performing, using the central server, in parallel:

storing each additional micro-data received in the fillable template, each additional micro-data being stored in a slot having an assigned number equal to the number of the additional micro-data; and executing an artificial intelligence ("AI") algorithm to use training data to complete the fillable template by filling in slots not yet filled by micro-data; and in response to the AI algorithm generating an AI-completed fillable template with a predicted accuracy level greater than a threshold accuracy level, the central server processing the AI-completed fillable template as the transaction prior to having received all of the micro-data.

12. The method of claim 11 wherein the micro-data includes at least one thousand pieces of data.

13. The method of claim 11 wherein the micro-data includes a number of pieces of data that is greater than a threshold value.

14. The method of claim 11 wherein each piece of micro-data stores a portion of a string of code.

15. The method of claim 11 further comprising using the central server processor executing a routine to verify each micro-data before adding it to the temporary queue, wherein the verifying comprises determining if the micro-data includes corrupted or harmful data.

16. The method of claim 11 further comprising executing, using the central server, a routine to verify each micro-data before adding it to the fillable template, wherein the verifying comprises determining if the micro-data includes corrupted or harmful data.

17. The method of claim 11 further comprising executing, using the central server, a machine learning algorithm to:
plot receipt times of each received micro-data;
generate an expected behavior of subsequent receipt times of micro-data; and
if receipt times of micro-data deviates from the expected behavior by a deviation amount, executing a forced reject of the transaction.

18. The method of claim 11 further comprising:
receiving, using the central server, all of the micro-data prior to the AI algorithm generating an AI-completed fillable template, the received micro-data being used to fully populate the fillable template; and
executing, using the central server, the transaction based on the data stored in the fully populated fillable template.

* * * * *